Patented Dec. 5, 1922.

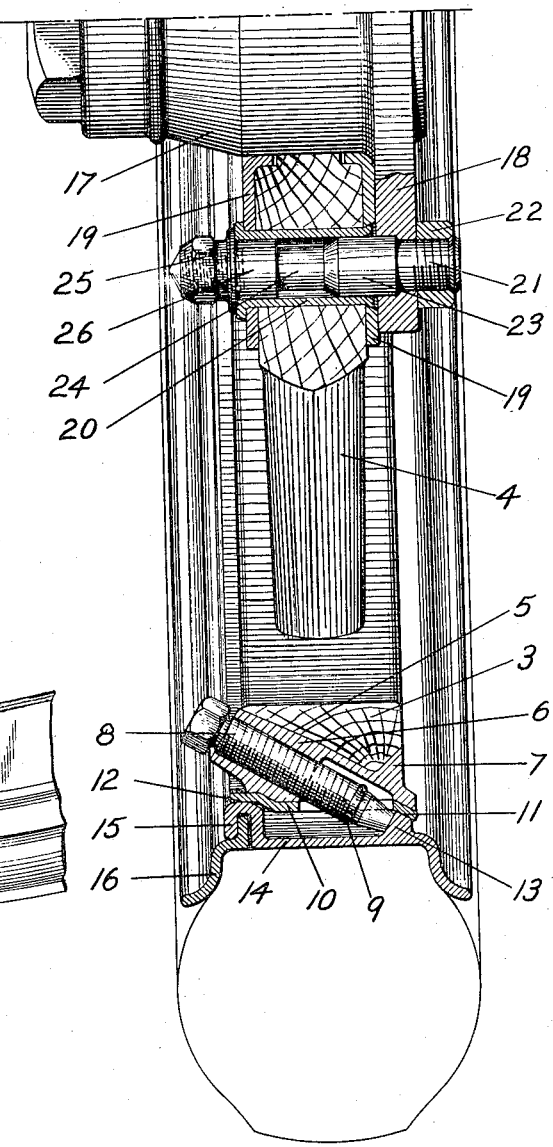

1,437,993

UNITED STATES PATENT OFFICE.

SYDNEY I. PRESCOTT, OF NEW YORK, N. Y., AND FRANCIS J. RUMMLER, OF LYNDHURST, NEW JERSEY.

WOOD WHEEL.

Application filed March 11, 1920. Serial No. 364,938.

*To all whom it may concern:*

Be it known that we, SYDNEY I. PRESCOTT and FRANCIS J. RUMMLER, citizens of the United States, respectively residing in the city, county, and State of New York, and the town of Lyndhurst, county of Bergen, and State of New Jersey, have invented a new and useful Improvement in Wood Wheels, of which the following is a specification.

This invention relates to an improvement in wood wheels of the type designed to be equipped with pneumatic tires.

In our co-pending application, filed December 12, 1919, Serial No. 344282, there is disclosed a universal wheel presenting a triple tire changing system, and reference is made to said application for a full disclosure of the broad invention disclosed in that and involved in this application. The present invention has for its main object the production of a wood wheel embodying the main features and advantages of the earlier one, and certain distinctive features of its own. With this and other objects not specifically mentioned in view, the invention consists in certain constructions and combinations which will be hereinafter fully described and then specifically set forth in the claims hereunto appended.

In the accompanying drawings which form a part of this application and in which like characters of reference indicate the same or like parts, Fig. 1 is a sectional view of a part of a wood wheel constructed in accordance with the invention, and Fig. 2 is a fragmentary side view of a part of the structure shown in Fig. 1.

In carrying the invention into effect, there is provided a wood spoke and felloe structure consisting of a felloe 3 and a series of spokes 4 assembled in the usual manner. This structure is preferably provided with a series of angular transverse recesses 5 in its periphery designed to receive a series of self-contained rim holding devices each including an angular nut 6 provided with a locating spur 7, a thrust screw 8 working in said nut, and a split ring 9 lying in a circumferential groove in said screw and adapted to retain the screw in the nut when it is in rim releasing position. These rim holding devices have the same general characteristics as those of the earlier application above referred to.

All of the rim holding devices are preferably firmly held in position in the recesses by means of a felloe band 10 which is forced on the felloe and over said devices under heavy pressure, in a manner well known in the art. By this or equivalent means the rim holding devices are permanently seated in the recesses during the construction of the wheel.

The felloe band 10 is shaped to provide two rim supporting steps 11 and 12 of different diameters, and the thrust screws work between these steps and engage an inner peripheral rib 13 formed on a demountable rim 14 and resting on the larger step 11. The rim 14 is also provided with a second inner peripheral rib 15 resting on the step 12 and carrying a split tire flange 16. This rim and its operation are fully disclosed in the earlier application above referred to.

Means for attaching the structure to a hub is provided. As shown, this means is preferably of such character that the structure may be easily and quickly mounted on or demounted from a hub 17 provided with a flange 18. With this end in view, the central part of the wood structure is reinforced preferably by an annular plate 19 on either side thereof, the plates being connected by means of a series of sleeves 20. The outer end of each sleeve is flanged over the outer plate, and its inner end is swaged into the inner plate as clearly shown in the drawings. The devices just described are permanently secured to the wood structure during the construction of the wheel.

Coacting with the series of sleeves is a corresponding series of hub bolts 21 held immovable in the flange 18 by means of nuts 22, the bolt ends being peened over the nuts in a well known manner to prevent accidental loosening of said bolts. Each bolt is provided with a driving section 23 directly engaging one of the sleeves, and with a smaller holding section 24 projecting beyond its driving section. Threaded on the outer end of each bolt is a nut 25 having a skirt 26 engaging the holding section of the bolt and also the sleeve. The outer diameter of the nut skirts is the same as that of the driving sections of the bolts. As a result of this construction, the drive is in part directly to the sleeves through the driving sections of the bolts, and in part indirectly to the sleeves through the holding sections of the bolts and the nut skirts. The driving pressure thus exerted on the nut skirts prevents the nuts from working loose under varying driving stresses.

As in the steel structure disclosed in the earlier application above identified, so in this structure a tire may be demounted by simply removing the tire flange 16, without disturbing the rest of the wheel; or, the tire and rim as a unit may be demounted by simply backing out a part of the thrust screws 8 until the split rings come into engagement with the threads of the nuts 6 and stop them; or, the tire, the rim, and the wood spoke and felloe structure, as a unit, may be demounted from the hub by simply removing the nuts 25. The same wheel, therefore, satisfies the requirements of those motorists who prefer to carry a spare wheel or two, those who prefer to carry a spare rim or two, and those who carry only spare tires or no spare tires, tire changing being easily and quickly effected in either case.

Changes and variations may be made in the structure by means of which the invention is carried into effect. The invention, therefore, is not to be restricted to the precise details of the structure shown and described.

What is claimed is:

1. In a wheel, the combination with a wood spoke and felloe structure provided with a series of transverse recesses in its periphery, of a series of long-threaded nuts located in said recesses and each having a thrust-resistant spur engaging said felloe in one of said recesses, a felloe band engaging and holding said nuts in said recesses and forming two rim supporting steps of different diameters, and a series of thrust screws working in said nuts between said steps and adapted to engage a rim where it rests on the larger step.

2. In a wheel, the combination with a wood spoke and felloe structure provided with a series of transverse recesses in its periphery, of a series of long-threaded nuts permanently seated in said recesses and each having a thrust-resistant spur engaging said felloe, a series of thrust screws working in said nuts and adapted to engage a rim, and means for retaining said screws in said nuts when in rim releasing position.

3. In a wheel, the combination with a wood spoke and felloe structure provided with a series of transverse recesses in its periphery, of a series of long-threaded nuts permanently seated in said recesses and each having a thrust-resistant spur engaging said felloe, and a series of thrust screws working in said nuts and adapted to engage a rim.

4. In a wheel, the combination with a wood spoke and felloe structure provided with a series of transverse recesses of reentrant angularity in its periphery, of a series of self-contained rim holding devices fitting said recesses, and a felloe band engaging and holding said devices in said recesses.

5. In a wheel, the combination with a wood spoke and felloe structure provided with a series of transverse recesses of reentrant angularity in its periphery, of a series of self-contained rim holding devices permanently seated in said recesses.

6. In a wheel, the combination with a wood spoke and felloe structure provided with a series of transverse recesses of reentrant angularity in its periphery, of a series of self-contained rim holding devices permanently fitted in said recesses each device including a nut, a thrust screw working in said nut and having an annular groove, and a spring ring mounted in said groove.

In testimony whereof, we have signed our names to this specification.

SYDNEY I. PRESCOTT.
FRANCIS J. RUMMLER.